US010272763B2

(12) United States Patent
Venturi et al.

(10) Patent No.: US 10,272,763 B2
(45) Date of Patent: Apr. 30, 2019

(54) HYBRID VEHICLE POWERTRAIN WITH A DEVICE FOR CONNECTING/DISCONNECTING THE ELECTRIC MACHINE

(71) Applicant: IFP Energies nouvelles, Rueil-Malmaison (FR)

(72) Inventors: Stephane Venturi, Roiffieux (FR); Sebastien Magand, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/635,883

(22) Filed: Jun. 28, 2017

(65) Prior Publication Data

US 2018/0001756 A1 Jan. 4, 2018

(30) Foreign Application Priority Data

Jun. 29, 2016 (FR) ...................................... 16 56118

(51) Int. Cl.
*B60K 6/387* (2007.10)
*B60K 6/383* (2007.10)
(Continued)

(52) U.S. Cl.
CPC .............. *B60K 6/387* (2013.01); *B60K 6/365* (2013.01); *B60K 6/383* (2013.01); *B60K 6/48* (2013.01);
(Continued)

(58) Field of Classification Search
CPC ........ B60K 6/387; B60K 6/383; B60K 6/365; B60K 6/48; B60K 6/547; F16H 3/72;
(Continued)

(56) References Cited

U.S. PATENT DOCUMENTS

| 2007/0145749 A1 | 6/2007 | Holmes | |
| 2007/0254762 A1* | 11/2007 | Chachra | B60K 6/365 |
| | | | 475/5 |

(Continued)

FOREIGN PATENT DOCUMENTS

| FR | 2778611 A1 | 11/1999 |
| FR | 2955165 A1 | 7/2011 |

(Continued)

OTHER PUBLICATIONS

Search Report and Opinion issued in corresponding French Application No. 1656118 dated Feb. 28, 2017 (8 pages).

*Primary Examiner* — Jacob S. Scott
*Assistant Examiner* — Tinh Dang
(74) *Attorney, Agent, or Firm* — Fitch, Even, Tabin & Flannery LLP

(57) ABSTRACT

The present invention is a powertrain for a hybrid vehicle, comprising a driving and receiving machine (20), a thermal engine (10) and engine shaft (12), a speed variation device (14) including an engine epicyclic gear train (24) with a sun gear (34) and a crown (42) which are each connected to the engine shaft (12) by an engine controlled coupling (26, 28) and to a fixed part (40) of the powertrain by a one-way automatic coupling (30, 32). A planet gear carrier (46) and a machine epicyclic gear train (60) are arranged on a shaft (62) substantially parallel to engine shaft (12). The planet gear carrier comprises a sun gear (64), a crown (72), a planet gear carrier (68) and an epicyclic gear train controlled coupling (88). The speed variation device (14) comprises a device (94) for connecting and disconnecting and electrical machine (20) with a machine epicyclic gear train (60).

17 Claims, 3 Drawing Sheets

(51) Int. Cl.
*B60K 6/365* (2007.10)
*B60K 6/48* (2007.10)
*B60K 6/547* (2007.10)
*F16H 3/72* (2006.01)
*F16H 3/78* (2006.01)

(52) U.S. Cl.
CPC ............... *B60K 6/547* (2013.01); *F16H 3/72* (2013.01); *F16H 3/725* (2013.01); *F16H 3/78* (2013.01); *B60K 2006/4816* (2013.01); *B60Y 2200/92* (2013.01); *B60Y 2400/73* (2013.01); *F16H 2200/2007* (2013.01); *F16H 2200/2046* (2013.01); *F16H 2200/2069* (2013.01); *F16H 2200/2082* (2013.01); *F16H 2200/2094* (2013.01); *F16H 2306/54* (2013.01); *Y10S 903/91* (2013.01); *Y10S 903/913* (2013.01); *Y10S 903/914* (2013.01); *Y10S 903/919* (2013.01)

(58) Field of Classification Search
CPC .... F16H 3/725; F16H 3/78; F16H 2200/2007; F16H 2200/201; F16H 2200/2084; F16H 2200/2082; F16H 2200/2066; F16H 2200/2064; F16H 2200/2069; F16H 2200/2046; B60Y 2200/92; B60Y 2006/4816; B60Y 2400/73
See application file for complete search history.

(56) References Cited

U.S. PATENT DOCUMENTS

| | | |
|---|---|---|
| 2011/0172044 A1 | 7/2011 | Venturi |
| 2013/0172146 A1* | 7/2013 | Venturi .................. B60K 6/365 477/5 |
| 2014/0113760 A1* | 4/2014 | Diemer .................. B60K 6/365 475/149 |
| 2016/0032563 A1* | 2/2016 | Miyamoto ............. B60K 6/365 180/65.265 |
| 2016/0176280 A1 | 6/2016 | Kaltenbach et al. |
| 2017/0341502 A1* | 11/2017 | Scholle .................. B60K 6/543 |

FOREIGN PATENT DOCUMENTS

| | | |
|---|---|---|
| FR | 2962697 A1 | 1/2012 |
| WO | 2015/014555 A1 | 2/2015 |
| WO | 2015/071088 A1 | 5/2015 |

* cited by examiner

HYBRID VEHICLE POWERTRAIN WITH A DEVICE FOR CONNECTING/DISCONNECTING THE ELECTRIC MACHINE

CROSS-REFERENCE TO RELATED APPLICATION

Reference is made to French Patent Application No. 16/56.188, filed Jun. 29, 2016, which is hereby incorporated herein by reference in its entirety for all purposes.

BACKGROUND OF THE INVENTION

Field of the Invention

The present, invention relates to a powertrain, in particular for a hybrid vehicle.

Description of the Prior Art

As is already known, a hybrid vehicle comprises a powertrain that uses, alone or in combination, as a traction and propulsion drive, an internal-combustion thermal engine with at least one of a variable-speed transmission device and a driving and receiving machine such as a rotary electric machine connected to an electric source, such as one or more batteries.

This combination affords the advantage of optimizing the performances of this vehicle, both by reducing the discharge of emissions to the atmosphere and by decreasing the fuel consumption.

Thus, when the vehicle is to be driven with a high torque over a wide speed range while limiting exhaust gas and noise generation, as in an urban site, the electrical machine is preferably used for driving this vehicle.

On the other hand, the thermal engine is used for driving this vehicle for uses where a high driving power and a wide operating range are required.

BACKGROUND OF THE INVENTION

As is already known from French patent application No. 2,955,165 filed by the applicant, such a motor vehicle powertrain comprises a thermal engine with a shaft connected to a variable-speed transmission device including an epicyclic gear train with a sun gear and a crown connected each to the thermal engine shaft by a controlled coupling and to a fixed part of the powertrain by a one-way automatic coupling, and a planet gear carrier transmitting the speed variation to the drive axle of the vehicle through a transmission track.

In order to increase the speed variation capacity when the vehicle is driven by the electrical machine, the applicant has combined the variable-speed transmission device of the aforementioned document with another epicyclic gear train connecting the engine epicyclic gear train to a transmission track for motion transmission to the drive axle of this vehicle, as described in French patent application No. 2,962,697 filed by the applicant.

SUMMARY OF THE INVENTION

The applicant has improved the above described transmission device even further by providing a device enabling disconnection of the electrical machine while increasing the possibility of achieving other gear ranges when operating with the thermal engine.

The invention therefore relates to a powertrain for a hybrid vehicle, comprising a driving and receiving machine, a thermal engine with an engine shaft, a speed variation device including an engine epicyclic gear train with a sun gear and a crown, each connected to the engine shaft by an engine controlled coupling and to a fixed part of the powertrain by a one-way automatic coupling and a planet gear carrier, and a machine epicyclic gear train arranged on a shaft substantially parallel to the engine shaft. The epicyclic gear train comprises a sun gear, a crown, a planet gear carrier and an epicyclic gear train controlled coupling. The speed variation device comprises a device for connecting and disconnecting the electric machine of the driving and receiving machine with the machine epicyclic gear train.

The connection and disconnection device can comprise a toothed connecting wheel and a machine controlled coupling carried by the sun gear shaft of the machine epicyclic gear train.

The connection and disconnection device can comprise a toothed wheel fixedly carried by the sun gear shaft of the machine epicyclic gear train and a machine controlled coupling carried by a sleeve surrounding a rotor of the electrical machine of the driving and receiving machine and comprising a toothed pinion gear that cooperates with the toothed wheel fixedly carried by the sun gear shaft.

The toothed wheel fixedly carried by the sun gear shaft can comprise a coupling surface for the epicyclic gear train controlled coupling.

The sun gear carrier can comprise a coupling surface for the epicyclic gear train controlled coupling.

The toothed connecting wheel can carry at least one coupling surface with at least the machine controlled coupling.

The toothed connecting wheel can carry a coupling surface with the epicyclic gear train controlled coupling.

The controlled coupling can comprise a double-acting synchromesh.

BRIEF DESCRIPTION OF THE FIGURES

Other features and advantages of the invention will be clear from reading the description hereafter, given by way of non-limitative example, with reference to the accompanying figures wherein.

DETAILED DESCRIPTION OF THE INVENTION

Figure 1:
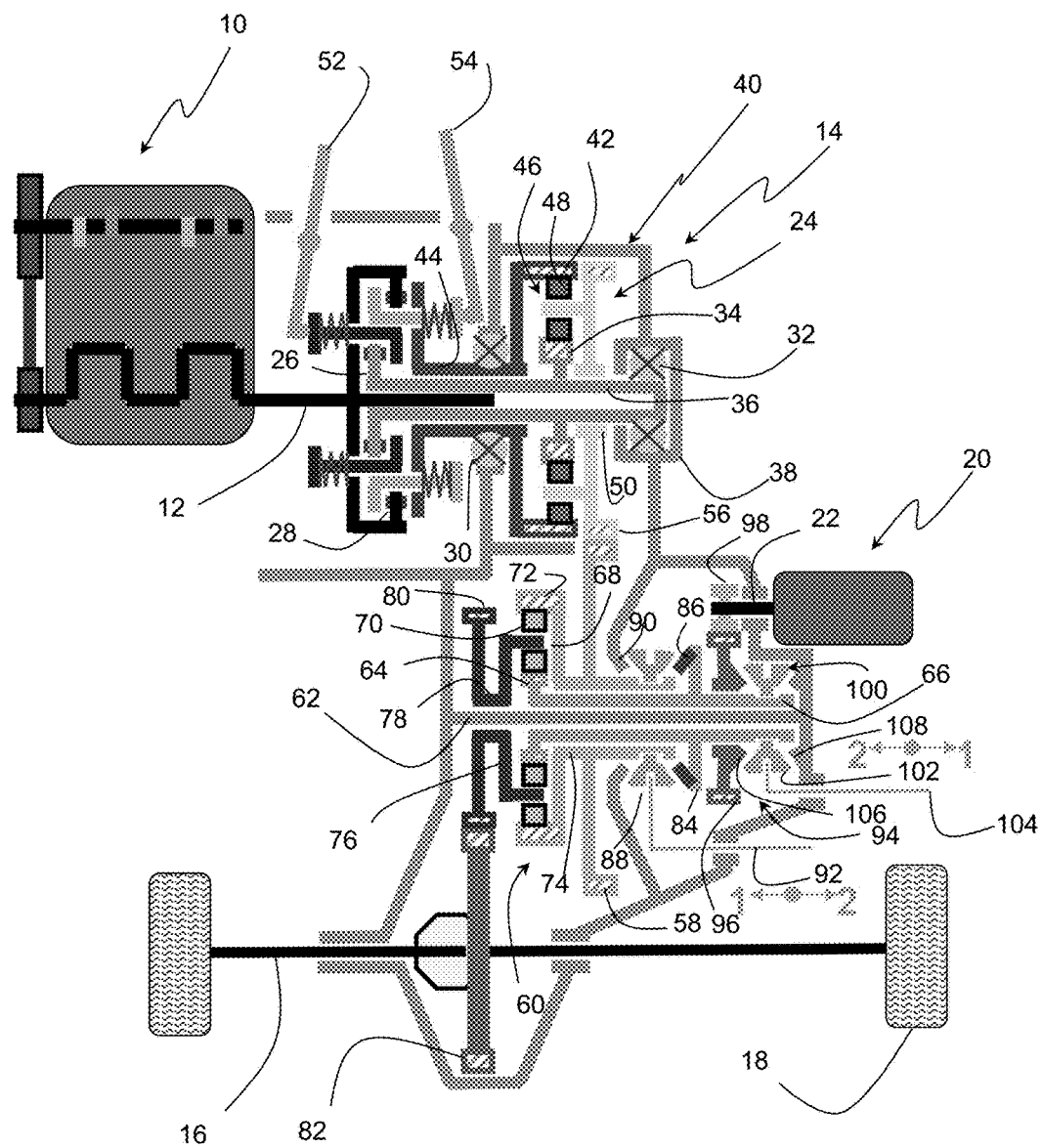
FIG. 1 is a diagram showing a variable-speed transmission device of a powertrain according to the invention.

In FIG. 1, the powertrain comprises a thermal engine 10, notably an internal-combustion engine, with an engine shaft 12, coming from the crankshaft of the engine, a variable-speed transmission device 14 and a drive axle 16 for driving the wheels 18 of the vehicle.

The powertrain also comprises a driving and receiving machine such as an electrical motor 20 with a rotor 22 that can be used as an electrical motor for driving the vehicle by being connected to an electrical power source, such as batteries (not shown) or as an electrical power generator and, more particularly, as an alternator for charging these batteries.

Of course, without departing from the scope of the invention, this driving and receiving machine can be of any other type, such as a hydraulic machine, an electrohydraulic machine, etc.

Speed variation device 14 comprises a main epicyclic gear train 24, referred to as engine epicyclic gear train, with two controlled couplings referred to as engine as controlled couplings 26, 28, here in form of friction clutches, and two one-way automatic couplings, such as free wheels 30, 32.

More precisely, engine epicyclic gear train 24 comprises an externally toothed sun gear 34 carried by a hollow shaft 36, referred to as sun gear shaft, which surrounds engine shaft 12 while being free in rotation but fixed in translation with respect thereto. The free end of this shaft rests in a bearing 38 carried by a fixed part 40 of the powertrain through free wheel 32, referred to as sun gear free wheel, which allows rotation of the sun gear in only one direction.

This gear train also comprises an internally toothed crown 42 which is arranged concentrically to the sun gear, and is connected to a hollow shaft 44, which is referred to as crown shaft, surrounding sun gear hollow shaft 36 while being free in rotation, but is fixed in translation with respect thereto. This crown is externally connected to a fixed part 40 of the vehicle powertrain by one-way coupling 30, referred to as crown free wheel, which allows rotation of the crown in only one direction.

Of course, the two free wheels 30 and 32 are arranged in such a way that sun gear 34 and crown 42 can rotate only in the same direction, and preferably in the same direction as engine shaft 12.

Finally, this engine epicyclic gear train comprises a planet gear carrier 46 with advantageously three planet gears 48 in the form of externally toothed wheels, arranged in the same angular interval with respect to one another (120° here) and meshing with the crown and the sun gear.

Crown 42, sun gear 34 and planet gears 48 are therefore arranged in the same plane, here in a vertical plane considering FIG. 1.

These planet gears are carried each by a horizontal pin connected to a tubular bearing 50, referred to as planet gear carrier bearing, surrounding sun gear shaft 36 while rotating freely thereon.

The free ends of the sun gear and crown shafts each carry a controlled coupling 26 and 28, which is preferably a friction clutch each controlled by a lever control 52 and 54.

Thus, clutch 26, which is referred to as sun gear clutch, allows coupling of the sun gear with engine shaft 12 while the purpose of clutch 28, which is referred to as crown clutch, allows coupling of the crown to this engine shaft.

As is more visible in FIG. 1, planet gear carrier 46 also comprises an externally toothed additional strip 56 arranged opposite the planet gears and connected through meshing to an externally toothed connecting strip 58 of another additional epicyclic gear train 60, referred to as machine epicyclic gear train.

This epicyclic gear train 60 is arranged on a fixed shaft 62 and is substantially parallel to engine shaft 12.

The machine epicyclic gear train comprises an externally toothed sun gear 64 rotatingly connected to a tubular shaft 66 surrounding fixed shaft 62.

Sun gear 64 cooperates with a planet gear carrier 68 advantageously comprising three planet gears 70, in form of externally toothed wheels, which are carried by planet gear pins arranged in the same angular interval with respect to one another (120° here) and meshing with crown 72 of the machine epicyclic gear train.

Crown gear 64 is carried by a tubular shaft 74 surrounding sun gear shaft 66.

Of course, as for engine epicyclic gear train 24, the crown, the sun gear and the planet gears are arranged in the same plane, which here is a vertical plane in FIG. 1.

As is more visible in the figure, planet gear pins 70 are carried by a disc 76 fastened to a tubular shaft 78 surrounding fixed shaft 62.

Tubular shaft 78 fixedly carries an externally toothed wheel 80 that cooperates with another toothed wheel 82 linked to drive axle 16 which forms a motion transmission track between machine epicyclic gear train 60 and axle 16.

Considering the right-hand part of FIG. 1, tubular sun gear shaft 66 fixedly carries a disc 84 carrying a coupling surface 86 that cooperates with a controlled coupling 88 carried by the crown shaft.

Coupling thus allows connection of crown shaft 74 either to sun gear shaft 66 or to a fixed coupling surface 90 carried by fixed part 40.

Advantageously, this coupling comprises a double-acting synchromesh, referred to as epicyclic gear train synchromesh, with two coupling positions (reference numerals 1 and 2) and a neutral position (represented by a point between reference numerals 1 and 2). This synchromesh is fixedly carried in rotation but freely in translation by crown shaft 74, and it is designed to cooperate, under the action of a control 92, with either coupling surface 86 of disc 84, or with fixed part 40 of the powertrain through surface 90.

Sun gear shaft 66 also carries a connection and disconnection device 94 between machine epicyclic gear train 60 and the electrical machine 20.

In FIG. 1, this device comprises an externally toothed connecting wheel 96 that cooperates with an externally toothed wheel 98 fixedly carried by rotor 22 of the electrical machine. This toothed connecting wheel is free to rotate on the sun gear shaft while facing a controlled coupling 100 carried by the shaft of this sun gear.

Coupling 100 thus allows connection of sun gear shaft 66 to the electrical machine 20 or to fixed part 40.

Advantageously, coupling 100 comprises a double-acting synchromesh 102, referred to as machine synchromesh, with two coupling positions (reference numerals 1 and 2) and a neutral position (represented by a point between reference numerals 1 and 2). This synchromesh is fixedly carried in rotation but freely in translation by sun gear shaft 66, and it is designed to cooperate, under the action of a control 104, with either a coupling surface 106 carried by toothed connecting wheel 96, or with fixed part 40 of the powertrain through another coupling surface 108.

The various configurations of the powertrain assembly are now described.

When machine synchromesh 102 is in position 1, it enables to connect sun gear shaft 66 with fixed part 40 of the powertrain and disconnection of the electrical machine 20 from this sun gear shaft through the free rotation of toothed connecting wheel 96.

In this configuration, the powertrain can operate with three thermal speed ratios and it can further achieve a parking brake function. The three thermal speed ratios are possible only if synchromesh 88 is in central position. In this case, machine epicyclic gear train 60 serves as a reducer and the three thermal speed ratios have lower ratios.

Positions 1 and 2 of synchromesh 88 both correspond to the parking brake function. In position 1, crown 72 is blocked on fixed part 40 directly through surface 90. In position 2, crown 72 is integral with sun gear 64, itself already connected to fixed part 40 through surface 108. In both cases, two of the shafts of the machine epicyclic gear train are blocked while being linked to the fixed part, which blocks planet gear carrier 68 and therefore axle 16.

In position 2 of synchromesh 102, toothed connecting wheel 96 is connected to sun gear shaft 66 through this synchromesh.

Through this connection, the electrical machine is connected to machine epicyclic gear train 60 and the powertrain can operate with two electrical driving modes, or three continuously variable transmission modes (eCVT) or three hybrid modes.

In neutral position, the electrical machine is also disconnected and it exerts no action on machine epicyclic gear train 60. In this neutral position of synchromesh 102, when synchromesh 88 is in position 2, crown 72 and sun gear 64 are interdependent. All the shafts of the machine epicyclic gear train have the same regime. In this configuration, the powertrain can operate with three pure thermal modes whose ratios between thermal engine and axle are identical to those of the aforementioned three hybrid modes.

Figure 2:
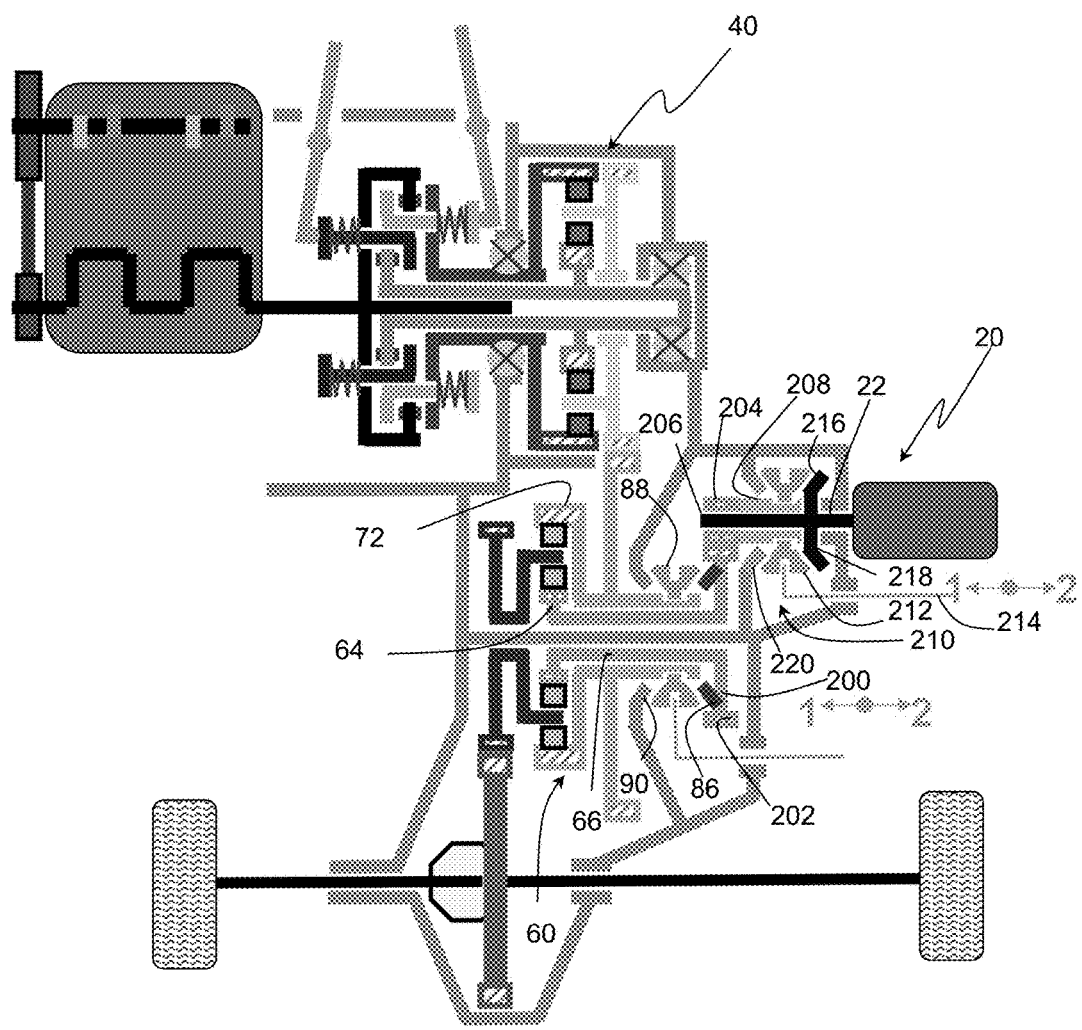
FIG. 2 diagrammatically illustrates a variant of FIG. 1.

The variant of FIG. 2 differs from the example of FIG. 1 only in a specific configuration of the connection and disconnection device between machine epicyclic gear train 60 and electrical machine 20.

The connection and disconnection device comprises a fixed toothed wheel 200 with sun gear shaft 66 that carries a coupling surface 86 with gear train synchromesh 88. Toothed strip 202 of this toothed wheel cooperates with a toothed pinion gear 204 mounted idle on an extension 206 of rotor 22 of electrical machine 20. Pinion gear 204 is fixedly connected to a sleeve 208 also mounted idle on extension 206 and carrying a controlled coupling 210.

As in the example of FIG. 1, this coupling comprises a double-acting synchromesh 212, referred to as machine synchromesh, with two coupling positions (reference numerals 1 and 2) and a neutral position (represented by a point between reference numerals 1 and 2). This synchromesh is carried fixedly in rotation but freely in translation by sleeve 208 and it is designed to cooperate, under the action of a control 214, with either a coupling surface 216 carried by a flange 218 fixedly arranged on the rotor and the extension thereof, or with fixed part 40 of the powertrain through another coupling surface 220.

The various configurations of the powertrain assembly for the example illustrated in FIG. 2 are described below.

When machine synchromesh 212 is in position 1, it enables connection of the toothed pinion gear and its sleeve 208 to fixed part 40 of the powertrain, and the pinion-sleeve-sun gear shaft 66 assembly is blocked in rotation. In this configuration, the machine is disconnected from gear train 60.

The powertrain can then operate with three thermal speed ratios. The operation is strictly identical to that described above for FIG. 1 when synchromesh 102 is in position 1, thus blocking shaft 66 at the housing.

The three thermal speed ratios are possible only if synchromesh 88 is in central position. In this case, machine epicyclic gear train 60 serves as a reducer, and the three thermal speed ratios have lower ratios.

Positions 1 and 2 of synchromesh 88 both correspond to the parking brake function. In position 1, crown 72 is blocked on fixed part 40 directly through surface 90. In position 2, crown 72 is integral with sun gear 64, itself already connected to fixed part 40 through toothed wheels 202 and 204, sleeve 208, synchromesh 210 and surface 220. In both cases, two of the machine gear train shafts are blocked while being connected to the housing, which blocks planet gear carrier 68 and consequently axle 16.

In position 2 of this synchromesh, the pinion gear and its sleeve are connected to the rotor-rotor extension assembly, thus allowing sun gear shaft 66 to be rotated.

Through this link, the electrical machine is connected to machine epicyclic gear train 60 and the powertrain can operate with two electrical driving modes, or three continuously variable transmission modes (eCVT) or three hybrid modes. The operation is here identical to that described for FIG. 1 when synchromesh 102 is in position 2.

In neutral position, the electrical machine is also disconnected from machine epicyclic gear train 60 and it exerts no action on this gear train. In this neutral position of synchromesh 212, when synchromesh 88 is in position 2, crown 72 and sun gear 64 are interdependent. All the shafts of the machine gear train have the same regime. In this configuration, the powertrain can operate with three pure thermal modes whose ratios between thermal engine and axle are identical to those of the aforementioned three hybrid modes.

Figure 3:
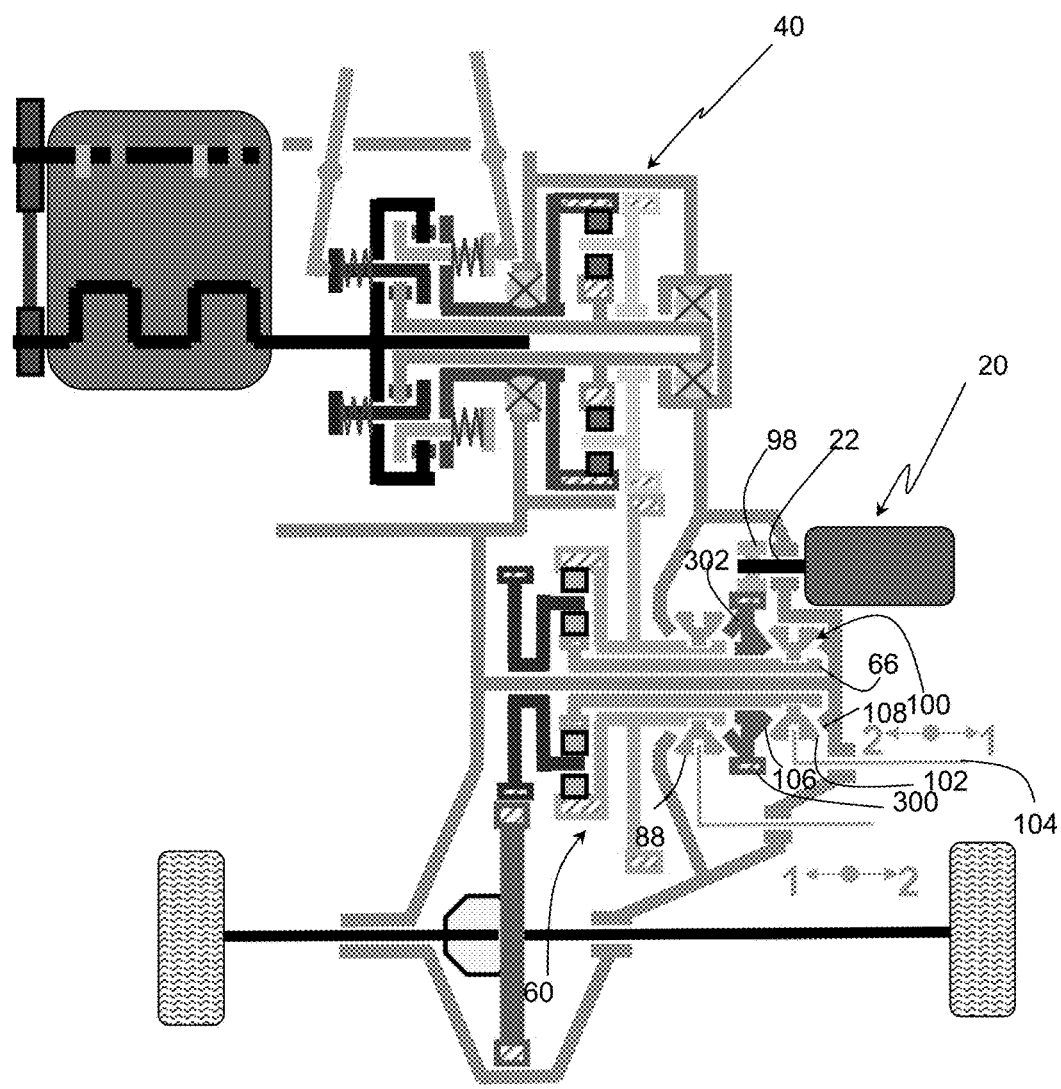
FIG. 3 shows another variant of FIG. 1.

The variant of the connection and disconnection device between machine epicyclic gear train 60 and electrical machine 20 of FIG. 3 differs from the example of FIG. 1 only in that the connection and disconnection device is not provided with disc 84 of FIG. 1 and that the coupling surface carried by this disc is here arranged on the toothed connecting wheel.

As is better visible in FIG. 3, externally toothed connecting wheel 300 cooperates with externally toothed wheel 98 fixedly carried by rotor 22 of electrical machine 20. This toothed connecting wheel carries, on its face opposite gear train synchromesh 88, a coupling surface 302 suited for cooperation with this synchromesh. The other face of this toothed connecting wheel carries a coupling surface 106 facing a controlled coupling 100 carried by sun gear shaft 66.

As in the example of FIG. 1, the controlled coupling is also a double-acting synchromesh 102, referred to as machine synchromesh, with two coupling positions (reference numerals 1 and 2) and a neutral position (represented by a point between reference numerals 1 and 2).

This synchromesh is carried fixedly in rotation but freely in translation by sun gear shaft 66 and it is designed to cooperate, under the action of a control means 104, with either a coupling surface 106 carried by toothed connecting wheel 96, or with fixed part 40 of the powertrain through another coupling surface 108.

The various configurations of the powertrain assembly are now detailed in the table hereafter.

| 88<br>Position of the epicyclic<br>gear train synchromesh | 100<br>Position of<br>the machine<br>synchromesh | Gear ratio |
|---|---|---|
| 1 | 1 | Parking brake |
| 1 | 0 | Neutral point |
| 1 | 2 | 1 short electric gear for forward/reverse |
| 0 | 1 | 3 short thermal gears |
| 0 | 0 | Neutral point |
| 0 | 2 | 3 eCVT modes (continuously variable transmission) |
| 2 | 1 | 3 short parallel hybrid gears + 1 intermediate |

| 88<br>Position of the epicyclic<br>gear train synchromesh | 100<br>Position of<br>the machine<br>synchromesh | Gear ratio |
|---|---|---|
| | | electric gear |
| 2 | 0 | 1 gear for battery recharge |
| 2 | 2 | 3 long parallel hybrid gears +<br>1 long electric gear |

The invention claimed is:

1. A powertrain for a hybrid vehicle, comprising a driving and receiving machine, a thermal engine including an engine shaft, a speed variation device including an engine epicyclic gear train with a sun gear and a crown which are each connected to the engine shaft by an engine controlled coupling and to a fixed part of the powertrain by a one-way automatic coupling and a planet gear carrier, and a machine epicyclic gear train located on a shaft that is parallel to the engine shaft and comprising a sun gear, a crown, a planet gear carrier and an epicyclic gear train controlled coupling, and wherein the speed variation device comprises a device for connection and disconnection of a machine of the driving and receiving machine with the machine epicyclic gear train.

2. The powertrain as claimed in claim 1, wherein the device for connection and disconnection of the driving and receiving machine comprises a toothed connecting wheel and a machine controlled coupling carried by a shaft of the sun gear of the machine epicyclic gear train.

3. The powertrain as claimed in claim 1, wherein the device for connection and disconnection comprises a toothed wheel fixedly carried by a shaft of the sun gear of the machine epicyclic gear train and a machine controlled coupling carried by a sleeve surrounding a rotor of the driving and receiving machine and comprising a toothed pinion gear cooperating with the toothed wheel which is fixedly carried by the shaft of the sun gear.

4. The powertrain as claimed in claim 3, wherein the toothed wheel which is fixedly carried by the shaft of the sun gear comprises a coupling surface for a epicyclic gear train controlled coupling.

5. The powertrain as claimed in claim 1, wherein the shaft of sun gear comprises a coupling surface for the epicyclic gear train controlled coupling.

6. The powertrain as claimed in claim 1, comprising a toothed connecting wheel which carries at least one coupling surface with at least a machine controlled coupling.

7. The powertrain as claimed in claim 2, comprising a toothed connecting wheel which carries at least one coupling surface with at least the machine controlled coupling.

8. The powertrain as claimed in claim 1, comprising a toothed connecting wheel carrying a coupling surface with the epicyclic gear train controlled coupling.

9. The powertrain as claimed in claim 2, comprising a toothed connecting wheel carrying a coupling surface with the epicyclic gear train controlled coupling.

10. The powertrain as claimed in claim 1, wherein the engine controlled coupling comprises a double-acting synchromesh.

11. The powertrain as claimed in claim 2, wherein the engine controlled coupling comprises a double-acting synchromesh.

12. The powertrain as claimed in claim 3, wherein the engine controlled coupling comprises a double-acting synchromesh.

13. The powertrain as claimed in claim 4, wherein the engine controlled coupling comprises a double-acting synchromesh.

14. The powertrain as claimed in claim 5, wherein the engine controlled coupling comprises a double-acting synchromesh.

15. The powertrain as claimed in claim 6, wherein the engine controlled coupling comprises a double-acting synchromesh.

16. The powertrain as claimed in claim 7, wherein the engine controlled coupling comprises a double-acting synchromesh.

17. The powertrain as claimed in claim 1, wherein the machine of the driving and receiving machine is an electrical machine.

* * * * *